(12) United States Patent
Toncelli

(10) Patent No.: US 8,747,712 B2
(45) Date of Patent: Jun. 10, 2014

(54) METHOD AND DEVICE FOR MANUFACTURING ARTICLES IN THE FORM OF SLABS OF CONGLOMERATE STONE OR STONE-LIKE MATERIAL

(76) Inventor: Luca Toncelli, Bassano del Grappa (IT)

( * ) Notice: Subject to any disclaimer, the term of this patent is extended or adjusted under 35 U.S.C. 154(b) by 133 days.

(21) Appl. No.: 11/917,251

(22) PCT Filed: Jun. 1, 2006

(86) PCT No.: PCT/EP2006/062836
§ 371 (c)(1),
(2), (4) Date: Dec. 12, 2007

(87) PCT Pub. No.: WO2006/136489
PCT Pub. Date: Dec. 28, 2006

(65) Prior Publication Data
US 2008/0203600 A1 Aug. 28, 2008

(30) Foreign Application Priority Data

Jun. 21, 2005 (IT) ................. TV2005A0090

(51) Int. Cl.
*B28B 1/08* (2006.01)
(52) U.S. Cl.
USPC .......... 264/71; 264/250; 264/308; 264/69; 264/333; 425/405.1; 425/424; 425/425; 425/432; 425/72.1; 425/73
(58) Field of Classification Search
USPC .......... 264/71, 112, 69, 571, 101, 299, 333, 264/250, 308; 425/405.1, 424, 425, 432, 425/456, 72.1, 73
See application file for complete search history.

(56) References Cited

U.S. PATENT DOCUMENTS 4,436,498 A * 3/1984 Murray ..................... 425/73
4,698,010 A * 10/1987 Toncelli ................... 425/200
(Continued)

FOREIGN PATENT DOCUMENTS

DE 2408503 9/1975
DE 19957352 4/2001
(Continued)

OTHER PUBLICATIONS

Written Opinion of the International Searching Authority and International Search Report dated Oct. 2, 2006 for the corresponding International Application PCT/EP2006/062836.
Israeli Office Action dated Feb. 16, 2012, from corresponding Israeli Application No. 187962.

*Primary Examiner* — Matthew Daniels
*Assistant Examiner* — Saeed Huda
(74) *Attorney, Agent, or Firm* — Katten Muchin Rosenman LLP

(57) ABSTRACT

During the manufacture of slabs of stone or stone-like material using the technology which envisages preparation of a mix formed by a granular product and by a binder consisting of a hardening synthetic resin, vacuum vibrocompression of a layer of said mix and hardening of the resultant rough slab by means of a catalytic action and by heating, the slab is cooled to room temperature by directing onto both its surfaces a flow of cooling fluid, in particular air at room temperature, while controlling the flowrate of the air, so as to ensure gradual and controlled cooling, and supporting the slab in a static and perfectly flat condition. The device consists of a flat structure provided with a plurality of spacers (20) which keep the slab in a perfectly flat condition and allow the flow of cooling fluid to perform its action.

9 Claims, 2 Drawing Sheets

(56) References Cited

U.S. PATENT DOCUMENTS

| | | | | |
|---|---|---|---|---|
| 5,328,508 A | * | 7/1994 | Lin | 106/723 |
| 5,800,752 A | * | 9/1998 | Charlebois | 264/71 |
| 5,928,585 A | | 7/1999 | Toncelli | |
| 6,572,811 B1 | | 6/2003 | Heirich | |
| 6,589,470 B2 | * | 7/2003 | Fried et al. | 264/443 |
| 6,713,015 B1 | * | 3/2004 | Toncelli et al. | 264/660 |
| 6,773,641 B1 | | 8/2004 | Toncelli | |
| 2008/0138455 A1 | * | 6/2008 | Hutchinson et al. | 425/72.1 |

FOREIGN PATENT DOCUMENTS

| | | |
|---|---|---|
| EP | 0786325 | 7/1997 |
| EP | 1027205 | 8/2000 |
| IT | 2004TV00103 | 5/2006 |
| WO | 2006048350 | 5/2006 |

\* cited by examiner

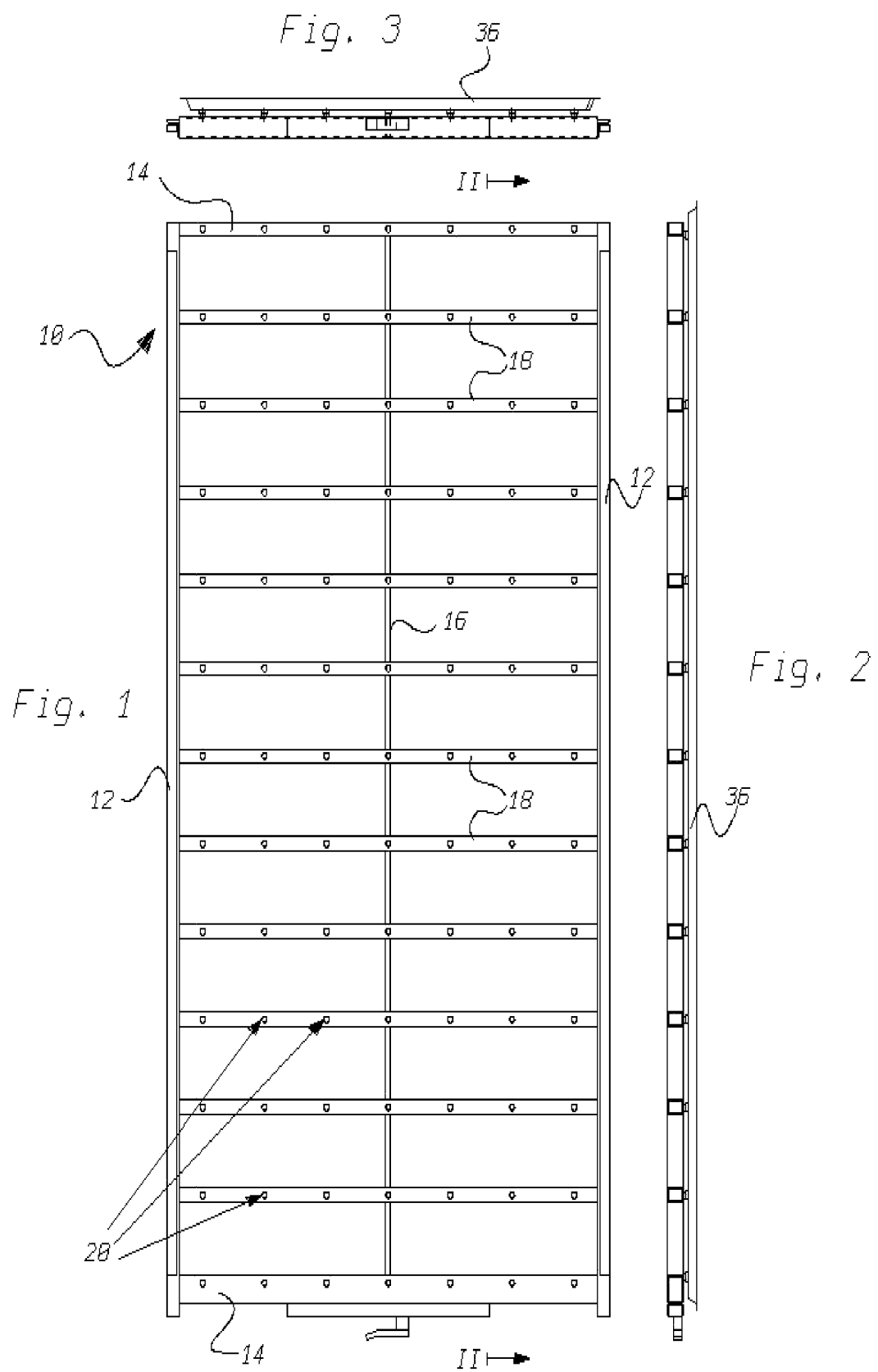

METHOD AND DEVICE FOR MANUFACTURING ARTICLES IN THE FORM OF SLABS OF CONGLOMERATE STONE OR STONE-LIKE MATERIAL

The present invention relates to the manufacture of conglomerate stone articles and more specifically to a method and a device for manufacturing articles in the form of slabs.

During recent years technologies for manufacturing articles in the form of slabs consisting of a conglomerate stone or stone-like material have been developed and have become established industrially, said articles being characterized by various advantageous properties including the possibility of manufacturing slabs with large dimensions (of about 3.2×1.6 meters) and with a relatively small thickness, such that they are ideal for forming internal and external flooring and cladding of buildings and furnishing components.

Secondly these slabs have a very uniform and homogeneous external appearance, in particular on their surface which is intended to remain visible, these properties being difficult to achieve in the case of slabs which are obtained by means of sawing from blocks of natural stone (such as marble, granite, porphyry, etc.).

Thirdly, these articles of conglomerate material may be manufactured from crushed surplus stone material, namely material which otherwise would remain unused after the operations performed when extracting blocks of stone material from quarries, with an obvious advantage from the point of view of both cost of the raw materials and environmental impact.

The technology in question envisages essentially:

(a) preparation of an initial mix consisting mainly of one or more granular products composed of stone or stone-like material, said granular products having a selected particle size, and a binder;

(b) deposition of a layer of this mix, having a predefined thickness, onto a temporary support surface or into a mould and subsequent covering of the mix with a similar support;

(c) a vacuum vibrocompression step during which the layer of mix is subjected to the action of a press in an environment in which a predefined vacuum has been formed and at the same time a vibratory movement of predetermined frequency is applied to the layer;

(d) a final step involving hardening of the resultant rough-formed slab, the procedures for which depend mainly on the nature of the binder.

In the technologies in question it is possible to use an inorganic binder, in particular a cement-based binder, in which case the hardening step is performed using the procedures appropriate for cement-based articles.

Alternatively, it is possible to use a binder consisting of a hardening organic resin, in which case hardening of the rough-formed sheet is performed using procedures which are well known for synthetic resins, usually by means of the combined action of a catalyst and heat applied as uniformly as possible to the surfaces of the rough-formed slab.

Slab-like articles made with a hardening resin binder have undoubted advantages compared to articles made with a cement-based binder, such as the possibility of manufacturing articles of limited thickness and a reduction in the duration of the hardening step. Articles manufactured with a cement-based binder have the advantage of a lower cost, which is an aspect of some importance in view of their final use.

For more detailed information regarding the processes and the plants for manufacturing both these types of slab articles reference should be made to the following patents: European patent Nos. 786,325 and 1,027,205 relating to the use of organic binders and Italian application No. TV2004A000103 relating to inorganic binders.

The present invention relates specifically to the technology for manufacturing articles in the form of slab where the binder is a synthetic resin, almost exclusively consisting of an unsaturated polyester resin or a thermosetting resin.

Even more specifically the present invention relates to the final step of hardening of the rough-formed slab resulting from the vacuum vibrocompression step. In fact, in the past it was found that not infrequently the slab obtained after the hardening and cooling step had defects in terms of its flatness, which in some cases took the form of actual warping, making the slab practically unusable.

For this reason, hitherto much attention has been paid to the actual hardening step, it being considered that lack of uniformity in heating of the surfaces of the slabs was responsible for these defects.

During this step the rough-formed slab is heated to a temperature of between 90 and 180° C. and kept at this temperature until the catalytic step for polymerization of the thermosetting resin is completed. In order to avoid non-uniform heating, the rough-formed slab, which is enclosed inside the moulding support, is inserted between two perfectly flat hot surfaces having a uniform temperature and the application of heat is performed by means of direct transmission from the surfaces, via the moulding support, to the adjacent surface of the slab; the moulding support may consist of sheets of laminated paper or preferably sheets of elastomer material.

After high-temperature catalysis of the resin, the slab is cooled down naturally to room temperature, normally being arranged in a vertical position so as to form a stack of slabs. In some applications, the slab, before being arranged vertically in a stack, is cooled down to about 50-60° C. by causing it to be displaced on a motor-driven carriage, if necessary with the application of an air flow thereon. However, despite these measures adopted, such as the one mentioned here, sometimes the final slab has defects such as warping or twisting equivalent to a few millimeters.

On average with the process used at present about 30% of the slabs produced may have deformations with respect to an ideal surface, deformations which may be as much as 3-4 mm in length and up to 2 mm in width.

The main object of the present invention is to solve this problem and eliminate the aforementioned defects in the final slabs resulting from the step of hardening the thermosetting synthetic-resin binder by catalytic methods and by means of the application of heat.

It has been found that this object is fully achieved with a method and a device incorporated in the process and the plant previously mentioned, in particular downstream of the section for hardening the rough-formed slab.

More specifically, the method according to the invention is characterized in that the two surfaces of the slab, at the end of the high-temperature catalysis step, are uniformly cooled down to room temperature and in any case to below the glass transition temperature of the resin, by means of a fluid flow, preferably air at room temperature, the slab being statically supported in a perfectly flat condition for this purpose, so that the air flow may freely come into contact with both the surfaces of the slab.

It has been found that the slab extracted from the catalysis oven, if cooled uniformly on a perfectly flat support down to room temperature, definitively assumes the perfectly flat configuration of the support. In fact, the slab extracted from the catalysis oven has a temperature of over 90° C. and therefore higher than the glass transition temperature of the binding resin present in a formulation with volumetric percentages equal to 15-20%. Despite consisting of a thermosetting resin, such a high temperature still allows a certain rearrangement of the macromolecules of the resin and a small relative displacement of the stone granules; as a result the slab, under its own weight, is able to readjust a few millimeters, this nevertheless being sufficient for it to assume definitively, during cooling down to room temperature and in any case to a temperature below the glass transition temperature of the resin, the perfectly flat configuration of the surface on which it is supported in a static manner and on which it rests.

In particular, in the method according to the present invention, cooling by means of an air flow at room temperature is performed so that the reduction in temperature of the surfaces of the slab is gradual. For this purpose, preferably, the speed of the fluid flow is controlled, being kept at values of about 1.5-2.5 m/min.

In turn, the device according to the present invention consists of a rigid, metallic, flat structure for supporting the slab leaving the heating and catalytic hardening oven, said flat structure having a plurality of spacers which are preferably made of material with a low conductivity and able to keep the slab support surface in a perfectly flat condition and separated from the spacer mounting surface by a distance such as to allow the uniform and controlled distribution of the flow of cooling fluid and limit the heat flow from the slab towards the flat structure, which could result in undesirable deformation.

Preferably, the spacer mounting surface consists of a substantially rectangular frame, the larger sides of which are connected by a plurality of cross-pieces to the surface of which the spacers are fixed.

The slabs leave the catalysis oven normally at a rate of one every 2 to 4 minutes; the flat structures statically supporting the slabs during the cooling step, which lasts about 40-80 minutes, may be arranged alongside each other or may be displaced along a circuit or preferably may be inserted inside a tower provided with channels for supplying the cooling fluid. It is essential, however, to ensure the perfectly flat arrangement of the cooling surfaces, preventing any possible deformation thereof, and ensure a constantly uniform flow of cooling fluid on the two sides.

Using the method and the cooling device according to the present invention it can be noted that, in practice, all the slabs produced have a maximum deformation relative to the aforementioned ideal plane of 1.0 mm lengthwise and 0.5 mm widthwise, such as to remain well within the working tolerances.

The features and advantages of the present invention will emerge more clearly from the description which follows with reference to the accompanying drawings in which:

FIG. 1 is a plan view, from above, of the cooling surface;

FIG. 2 is a cross-sectional view along the plane II-II of FIG. 1;

FIG. 3 is an end view, along the short side, of the flat structure shown in FIG. 1, and;

Figure 4:
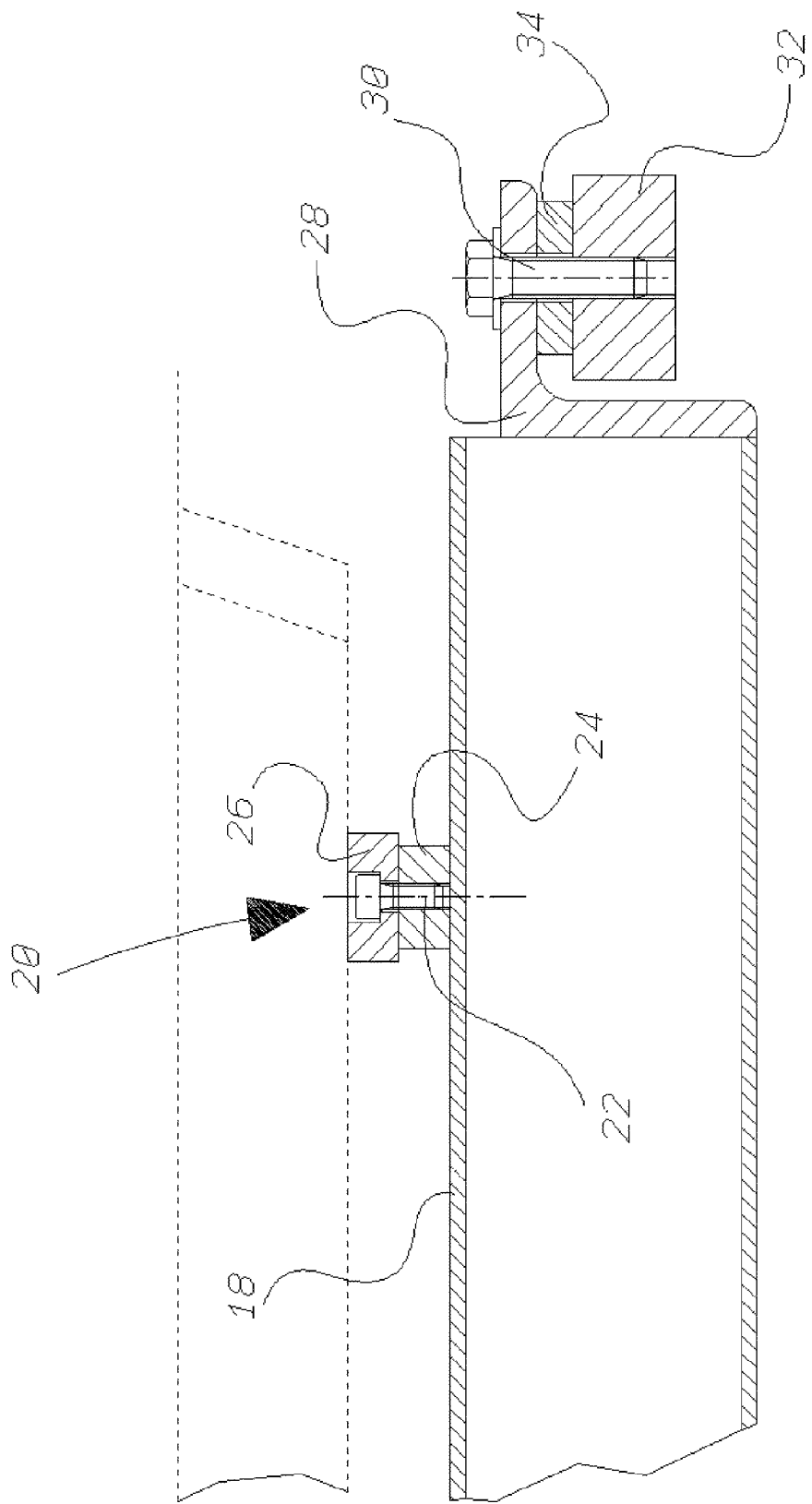
FIG. 4 is a view, on a larger scale, of a portion of the flat structure and a spacer.

With reference to the Figures, in which, as already mentioned, solely the slab cooling surface is shown, in the preferred embodiment it comprises a metal frame 10 which is sufficiently rigid such that it does not deform substantially under the weight of the slab and which is defined by two longitudinal side members 12 and by two end cross-members 14.

From FIG. 1 it can be readily understood that a further central, reinforcing, longitudinal member 16 is provided, while the longitudinal members 12 are connected by a plurality of cross-pieces 18 which are rigidly fixed at preferably regular intervals to the two longitudinal members 12.

Each cross-piece 18 has, fixed thereto, at generally regular intervals, spacers which are generally denoted by the reference number 20 and are preferably in the form of mushroom-shaped blocks of plastic material with a low conductivity (but with a perfectly flat upper surface), the shank 24 of which is fixed rigidly to the upper surface of the cross-piece 18, for example by means of the bolt 22, while the head 26 projects upwards, the surfaces for supporting the spacers on the cross-piece 18 being mechanically smoothed so as to form a uniform surface.

From FIG. 1 it can be readily understood how the plurality of spacers 20 defines a proper horizontal surface on which it is possible to rest the hardened slab leaving the step where catalytic hardening is performed together with heating to the temperatures mentioned above.

From FIG. 4 it can also be readily understood how the longitudinal members 12 are composed of an angular section 28 to which mechanically machined drawn parts 32 are fixed by means of screws 30 and spacers 34, said parts ensuring supporting, in a manner perfectly straight and coplanar with the spacers 20, of the metallic flat structure on the apparatus on which it is deposited for supplying of the cooling fluid.

FIGS. 2 and 3 show a slab 36 resting on the spacers 20 so that a space is formed underneath the slab, through which space it is possible to convey a flow of cooling fluid, preferably air at room temperature with a flowrate such as to control the speed of cooling of the sheet.

Even though the means for conveying and distributing the cooling air flow against the main surfaces of the slab 36 have not been shown in detail, since they consist of devices which are well known to persons skilled in the art, their important characteristic feature is that of ensuring gradual and uniform cooling of the slab on both the surfaces.

An important advantage offered by the present invention consists in the fact that the slab to be cooled is supported along a plurality of small surface portions so as to avoid substantially any lack of uniformity in cooling and at the same time keep the sheet in a perfectly flat condition, while preventing that an excessive flow of heat from the sheet towards the flat structure is able to cause deformation thereof.

The invention has been described in relation to a preferred embodiment, it being understood that conceptually and mechanically equivalent modifications and variants are possible and may be envisaged within the scope of the following claims.

The invention claimed is:

1. Method for manufacturing slabs of conglomerate material, the slabs having relatively large upper and lower surfaces with relatively small side wall thicknesses, the method comprising the steps of, in order:

(a) preparing an initial mix consisting of one or more granular products composed of stone or stone-like material, said granular products having a selected particle size, and a binder consisting of a thermosetting synthetic-resin binder;

(b) depositing a layer of the initial mix to have a predefined thickness onto a surface of a temporary support or into a mould, and subsequently covering with a similar support;

(c) vacuum vibrocompressing the layer of mix by subjecting the layer of mix to the action of a press in an environment in which a predefined vacuum has been formed and at the same time applying a vibratory movement of predetermined frequency to the layer;

(d) hardening of the resultant rough-formed slab by means of thermal catalysis of the binding resin;

(e) removing the rough-formed slab from the temporary support or mould, and (f) uniformly cooling the rough-formed slab into a perfectly flat-finished slab, the rough-formed slab being supported while laying flat in a major plane of the rough-formed slab, cooling is performed to a temperature at least below a glass transition temperature of the resin with a flow of a cooling fluid, and the flow of the cooling fluid is freely coming into contact with both the upper and lower surfaces of the slab.

2. Method for manufacturing articles in the form of slabs according to claim 1, wherein said cooling fluid is air at actual temperature between 5 degrees Celsius and 35 degrees Celsius.

3. Method for manufacturing articles in the form of slabs according to claim 2, wherein the speed of the air flow is controlled.

4. The method of claim 1, wherein the binder comprises an unsaturated polyester resin.

5. The method of claim 1, wherein the flow is at 1.5-2.5 m/min.

6. The method of claim 1, wherein step (e) comprises 40-80 minutes.

7. The method of claim 1, wherein a maximum deformation of 1.0 mm lengthwise and 0.5 mm widthwise occurs.

8. The method of claim 1, wherein step (e) is performed between the temperature range of 180 degrees Celsius to 50 degrees Celsius.

9. Method for manufacturing slabs of conglomerate material, the slabs having relatively large upper and lower surfaces with relatively small side wall thicknesses, the method comprising the steps of, in order:

(a) preparing an initial mix consisting of one or more granular products composed of stone or stone-like material, said granular products having a selected particle size, and a binder consisting of a thermosetting synthetic-resin binder;

(b) depositing a layer of the initial mix to have a predefined thickness onto a surface of a temporary support or into a mould, and subsequently covering with a similar support;

(c) vacuum vibrocompressing the layer of mix by subjecting the layer of mix to the action of a press in an environment in which a predefined vacuum has been formed and at the same time applying a vibratory movement of predetermined frequency to the layer;

(d) hardening of the resultant rough-formed slab by means of thermal catalysis of the binding resin;

(e) removing the rough-formed slab from the temporary support or mould, and (f) uniformly cooling the rough-formed slab into a perfectly flat-finished slab, the rough-formed slab being supported while laying flat in a major plane of the rough-formed slab, cooling is performed to a temperature at least below a glass transition temperature of the resin with a flow of a cooling fluid, and the flow of the cooling fluid is freely coming into contact with both the upper and lower surfaces of the slab;

wherein said cooling fluid is air at actual temperature between 5 degrees Celsius and 35 degrees Celsius.

* * * * *